United States Patent
Seeger

(10) Patent No.: US 10,451,418 B2
(45) Date of Patent: Oct. 22, 2019

(54) MEMS GYROSCOPE AMPLITUDE CONTROL VIA QUADRATURE

(71) Applicant: InvenSense, Inc., San Jose, CA (US)

(72) Inventor: Joseph Seeger, Menlo Park, CA (US)

(73) Assignee: InvenSense, Inc., San Jose, CA (US)

( * ) Notice: Subject to any disclaimer, the term of this patent is extended or adjusted under 35 U.S.C. 154(b) by 903 days.

(21) Appl. No.: 14/963,526

(22) Filed: Dec. 9, 2015

(65) Prior Publication Data

US 2017/0199035 A1     Jul. 13, 2017

(51) Int. Cl.
*G01C 19/5726* (2012.01)
*G01C 19/5776* (2012.01)

(52) U.S. Cl.
CPC ..... *G01C 19/5726* (2013.01); *G01C 19/5776* (2013.01)

(58) Field of Classification Search
CPC ............ G01C 19/5726; G01C 19/5776; G01C 19/5719; G01P 15/14; G01P 21/00; G01P 15/097; A63B 2220/40
See application file for complete search history.

(56) References Cited

U.S. PATENT DOCUMENTS

| | | | | |
|---|---|---|---|---|
| 6,817,244 B2* | 11/2004 | Platt | ............... | G01C 19/56 73/504.12 |
| 8,584,524 B2* | 11/2013 | Hsu | ............... | G01C 19/5719 73/514.29 |
| 2006/0213265 A1* | 9/2006 | Weber | ............... | G01C 19/5719 73/504.02 |
| 2006/0213266 A1* | 9/2006 | French | ............... | G01C 19/5719 73/504.02 |
| 2008/0236280 A1* | 10/2008 | Johnson | ............... | G01C 19/5719 73/504.14 |
| 2010/0319451 A1* | 12/2010 | Trusov | ............... | G01C 19/5719 73/504.12 |
| 2012/0125101 A1* | 5/2012 | Seeger | ............... | G01C 19/5755 73/504.14 |
| 2012/0125104 A1* | 5/2012 | Qiu | ............... | G01P 15/125 73/514.32 |
| 2013/0263641 A1* | 10/2013 | Opris | ............... | G01P 21/00 73/1.38 |
| 2014/0090471 A1* | 4/2014 | Hsu | ............... | G01C 19/5712 73/514.29 |
| 2015/0211854 A1* | 7/2015 | Ruohio | ............... | G01C 19/5712 73/504.12 |

\* cited by examiner

*Primary Examiner* — Harshad R Patel
*Assistant Examiner* — Nigel H Plumb
(74) *Attorney, Agent, or Firm* — Haley Guiliano LLP; Joshua Van Hoven

(57) ABSTRACT

A system and/or method for utilizing quadrature signals, for example in a MEMS gyroscope, to control drive signal characteristics (e.g., amplitude, etc.). As a non-limiting example, a quadrature signal in a MEMS gyroscope may be isolated and/or processed to generate a drive signal that is used to drive a proof mass. Such a quadrature signal may, for example, be obtained passively as part of general Coriolis signal processing. Also for example, such a quadrature signal may be actively created and/or obtained through the use of electrical and/or mechanical features.

20 Claims, 2 Drawing Sheets

MEMS GYROSCOPE AMPLITUDE CONTROL VIA QUADRATURE

CROSS-REFERENCE TO RELATED APPLICATIONS/INCORPORATION BY REFERENCE

Various aspects of the present disclosure are demonstrated by non-limiting example in commonly owned U.S. Pat. No. 7,290,435, titled "Method and Apparatus for Electronic Cancellation of Quadrature Error," filed Feb. 6, 2006; U.S. patent application Ser. No. 13/235,296, titled "Micromachined Gyroscope Including a Guided Mass System," filed Sep. 16, 2011; and U.S. patent application Ser. No. 14/041,810, titled "Micromachined Gyroscope Including a Guided Mass System," filed Sep. 30, 2013; the entirety of each of which is hereby incorporated herein by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

MEMS sensors, for example MEMS gyroscope sensors, are substantial consumers of energy. For example, MEMS gyroscopes generally rely on relatively high-quality and high-power circuitry, for example amplifier circuitry, to work properly. The use of lower-power circuitry, however, often leads to reduced performance. Limitations and disadvantages of conventional MEMS sensors and methods will become apparent to one of skill in the art, through comparison of such approaches with some aspects of the present systems and methods set forth in the remainder of this disclosure with reference to the drawings.

SUMMARY

Figure 1:
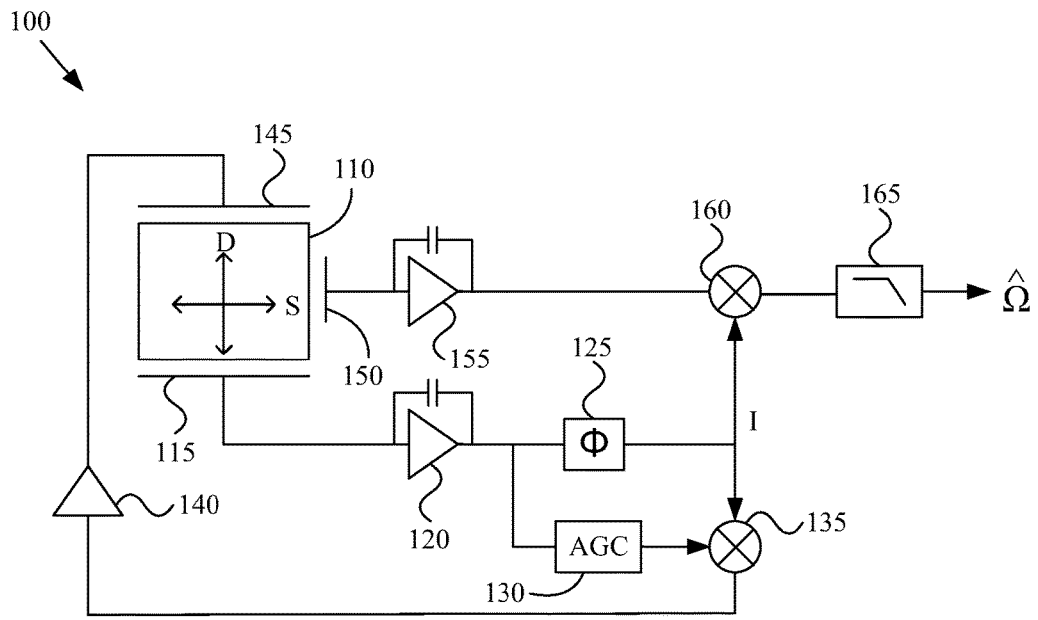
FIG. 1 shows an example block diagram of a MEMS gyroscope circuit, in accordance with various aspects of the present disclosure.

Various aspects of this disclosure comprise a system and/or method for utilizing quadrature signals, for example in a MEMS gyroscope, to control drive signal characteristics (e.g., amplitude, etc.). As a non-limiting example, a quadrature signal in a MEMS gyroscope may be isolated and/or processed to generate a drive signal that is used to drive a proof mass. Such a quadrature signal may, for example, be obtained passively as part of general Coriolis signal processing. Also for example, such a quadrature signal may be actively created and/or obtained through the use of electrical and/or mechanical features.

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

The following discussion may at times utilize the phrase "A and/or B." Such phrase should be understood to mean just A, or just B, or both A and B. Similarly, the phrase "A, B, and/or C" should be understood to mean just A, just B, just C, A and B, A and C, B and C, or all of A and B and C.

The following discussion may at times utilize the phrases "operable to," "operates to," and the like in discussing functionality performed by particular hardware, including hardware operating in accordance with software instructions. The phrases "operates to," "is operable to," and the like include "operates when enabled to." For example, a module that operates to perform a particular operation, but only after receiving a signal to enable such operation, is included by the phrases "operates to," "is operable to," and the like. Also for example, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The following discussion may at times refer to various system or device functional modules or circuitry (e.g., sensor circuitry, proof mass drive control circuitry, etc.). It should be understood that the functional modules or circuitry were selected for illustrative clarity and not necessarily for denoting distinctly separate hardware and/or software modules. For example, any one or more of the modules or circuits discussed herein may be implemented by shared hardware, including for example a shared processor. Also for example, any one or more of the modules discussed herein may share software portions, including for example subroutines. Additionally for example, any one or more of the modules discussed herein may be implemented with independent dedicated hardware and/or software. Accordingly, the scope of various aspects of this disclosure should not be limited by arbitrary boundaries between modules and/or circuits unless explicitly claimed. Additionally, it should be understood that when the discussion herein refers to a module or circuit performing a function, the discussion is generally referring to either a pure hardware module implementation and/or a processor operating in accordance with software. Such software may, for example, be stored on a non-transitory machine-readable medium.

In various example implementations discussed herein, a chip is defined to include at least one substrate typically formed from a semiconductor material. A single chip may for example be formed from multiple substrates, where the substrates are mechanically bonded to preserve the functionality. Multiple chip (or multi-chip) includes at least 2 substrates, wherein the 2 substrates are electrically connected, but do not require mechanical bonding.

A package provides electrical connection between the bond pads on the chip (or for example a multi-chip module) and a metal lead that can be soldered to a printed circuit board (or PCB). A package typically comprises a substrate and a cover. An Integrated Circuit (IC) substrate may refer to a silicon substrate with electrical circuits, typically CMOS circuits. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

In the described examples, an electronic device incorporating a sensor (e.g., one or more of the sensors discussed herein) may, for example, employ a motion tracking module also referred to as Motion Processing Unit (MPU) that includes at least one sensor in addition to electronic circuits. The at least one sensor may comprise any one or more of a variety of sensors, such as for example a gyroscope, a compass, a magnetometer, an accelerometer, a microphone, a pressure sensor or barometer, a resonator, a mass sensor, a chemical sensor, a proximity sensor, a moisture sensor, a temperature sensor, a biometric sensor, or an ambient light sensor, among others known in the art.

Some example system implementations may, for example, comprise an accelerometer, gyroscope, and magnetometer or other compass technology, which each provide a measurement along three axes that are orthogonal relative to each other, and may be referred to as 9-axis devices. Other example system implementations may, for example, comprise an accelerometer, gyroscope, compass, and pressure sensor, and may be referred to as 10-axis devices. Other embodiments might not include all the sensors or may provide measurements along one or more axes.

The various sensors discussed herein may, for example, be formed on a first substrate. Various embodiments may, for example, include solid-state sensors and/or any other type of sensors. The electronic circuits in the MPU may, for example, receive measurement outputs from the one or more sensors. In various example implementations, the electronic circuits process the sensor data. The electronic circuits may, for example, be implemented on a second silicon substrate. In some example implementations, the first substrate may be vertically stacked, attached and electrically connected to the second substrate in a single semiconductor chip, while in other example implementations, the first substrate may be disposed laterally and electrically connected to the second substrate in a single semiconductor package (e.g., both attached to a common packaging substrate or other material). In other example implementations, the sensors may, for example, be formed on different respective substrates (e.g., all attached to a common packaging substrate or other material).

In an example implementation, the first substrate is attached to the second substrate through wafer bonding, as described in commonly owned U.S. Pat. No. 7,104,129, which is hereby incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

MEMS sensors, for example gyroscopes, are substantial consumers of energy. For example, MEMS gyroscopes generally rely on relatively high-quality and high-power circuitry, for example amplifier circuitry, to work properly. The use of lower-power circuitry, however, often leads to reduced performance. Thus, in accordance with various aspects of the present disclosure, MEMS sensors and/or methods of operation are disclosed that utilize lower-power and/or lower-quality circuitry to reduce overall power consumption (e.g., extending battery life of mobile devices utilizing such sensors, etc.), while maintaining a high level of sensor performance.

FIG. 1 shows an example block diagram of a MEMS gyroscope circuit 100 (or system), in accordance with various aspects of the present disclosure. The example gyroscope circuit 100 and/or any gyroscope presented herein or portion thereof may, for example, share any or all characteristics with the example gyroscopes and/or portions thereof presented in commonly owned U.S. Pat. No. 7,290,435, titled "Method and Apparatus for Electronic Cancellation of Quadrature Error," filed Feb. 6, 2006; U.S. patent application Ser. No. 13/235,296, titled "Micromachined Gyroscope Including a Guided Mass System," filed Sep. 16, 2011; and U.S. patent application Ser. No. 14/041,810, titled "Micromachined Gyroscope Including a Guided Mass System," filed Sep. 30, 2013; the entirety of each of which is hereby incorporated herein by reference.

It should be understood that while examples of various aspects of this disclosure are presented in the context of MEMS gyroscope circuits, the scope of this disclosure is not limited to characteristics of MEMS sensor and/or gyroscope circuitry or operation thereof. For example, the various aspects of this disclosure are readily extendible to any or a variety of sensors (e.g., MEMS sensors or other) that utilize or drive a moving mass.

The circuit 100 comprises a mass 110, which may also be referred to herein as a proof mass, which is driven in a vibratory or oscillatory manner in the drive direction, labelled "D" in FIG. 1. The drive circuitry may, for example, comprise a drive sensor 115 (e.g., a capacitive sensor or other type of sensor), a drive sense C2V (capacitance to voltage) circuit 120, a phase shifter 125, a gain control circuit (AGC) 130, a drive mixer 135, a drive amplifier 140, and a drive actuator 145 (e.g., an electrostatic actuator).

The drive sensor 115 may, for example, sense movement of the proof mass 110 in the drive direction "D" and output a drive sense capacitance signal indicative of the sensed drive motion of the proof mass 110. The drive sense C2V circuit 120 may then convert the drive sense capacitance signal provided by the drive sensor 115 to a drive sense voltage signal, and provide the drive sense voltage signal to the phase shifter 125 and to the AGC circuit 130. In the example circuit 100, the drive sense C2V circuit 120 may, for example, comprise a relatively high-quality amplifier circuit (e.g., characterized by relatively high gain, relatively high bandwidth, relatively high linearity, relatively low noise, relatively high output dynamic range, relatively high slew rate, relatively fast convergence time, relatively high stability, etc.).

The phase shifter 125 may, for example, output an in-phase signal "I" (which is approximately 90 degree phase shifted from the drive sense capacitance signal and in-phase with the proof-mass velocity in the drive direction) to the drive mixer 135 for mixing with the output of the AGC circuit 130 to generate a drive signal. The drive signal is then amplified by the drive amplifier 140 and provided to the drive actuator 145, which generates the force (e.g., electrostatic force) to vibrate the proof mass 110 in the drive direction D.

The circuit 100 may also, for example, comprise a Coriolis sensor 150, a Coriolis sense C2V (capacitance to voltage) circuit 155, a sense mixer 160, and a low-pass filter 165. The Coriolis sensor 150 may, for example, sense movement of the proof mass 110 in the sense direction "S" and output a Coriolis sense capacitance signal indicative of the sensed motion of the proof mass 110 in the sense direction "S." The signal output from the Coriolis sensor 150 may generally, for example, comprise a composite signal that comprises a signal component indicative of the Coriolis force caused by rotation of the gyroscope and also a quadrature signal component, as discussed herein. The quadrature signal component may, for example, be proportional to the drive amplitude of the proof mass 110 and may be independent of rotation of the gyroscope. For example, the quadrature signal component may exist even when the gyroscope is not being rotated.

The Coriolis sense C2V circuit 155 may then convert the Coriolis sense capacitance signal provided by the Coriolis sensor 150 to a Coriolis sense voltage signal, and provide the Coriolis sense voltage signal to the sense mixer 160. In the example circuit 100, the Coriolis sense C2V circuit 155 may, for example, be a relatively high-quality amplifier circuit (e.g., characterized by relatively high gain, relatively high bandwidth, relatively high linearity, relatively low noise, relatively high output dynamic range, relatively high slew rate, relatively fast convergence time, relatively high stability, etc.). In an example implementation, the Coriolis sense C2V circuit 155 may be of a quality generally similar or the same as the drive sense C2V circuit 120 (e.g., generally similar in any or all of the performance characteristics discussed herein).

The sense mixer 160 may also, for example, receive the in-phase signal (I) output by the phase shifter 125. The sense mixer 160 may then mix the in-phase signal (I) and the Coriolis sense voltage signal received from the Coriolis sense C2V circuit 155 to generate a signal with the quadrature component removed. The output of the sense mixer 160 may then be filtered by the low-pass filter (LPF) 165 and output as a signal, $\hat{\Omega}$, which is indicative of the angular velocity at which the gyroscope is being rotated.

As mentioned herein, the signal output by the Coriolis sensor 150 may generally comprise a composite signal (S) that comprises a signal component indicative of the Coriolis force, which is due to gyroscope rotation, and a quadrature component, which may for example be generally due to imperfections in the gyroscope (e.g., imperfections in the proof mass, proof mass coupling, capacitive sensors, alignment of sensors to proof mass, etc.). See, for example, Equation 1:

$$S \alpha D(\omega \Omega \sin(\omega t) + Quad \cos(\omega t)) \quad \text{Equation 1}$$

The signal S is proportional to the drive amplitude D times an in-phase factor and a quadrature-phase factor. The in-phase factor may, for example, comprise the frequency of the drive oscillation, $\omega$, times the angular rotation of the gyroscope, $\Omega$, times $\sin(\omega t)$. The quadrature-phase factor may, for example, comprise a quadrature factor, Quad, times $\cos(\omega t)$.

Generally, such quadrature signals are undesirable and have a substantial magnitude relative to the desirable Coriolis-based signals. Accordingly, efforts have been made, and are continuing to be made, to reduce and/or eliminate quadrature signals. See, for example, commonly owned U.S. Pat. No. 7,290,435, titled "Method and Apparatus for Electronic Cancellation of Quadrature Error," filed Feb. 6, 2006, the entirety of which is hereby incorporated herein by reference. In accordance with various aspects of this disclosure, however, quadrature signals may be utilized to beneficially reduce power consumption of gyroscope circuits. A first example of such utilization is illustrated in FIG. 2.

Figure 2:
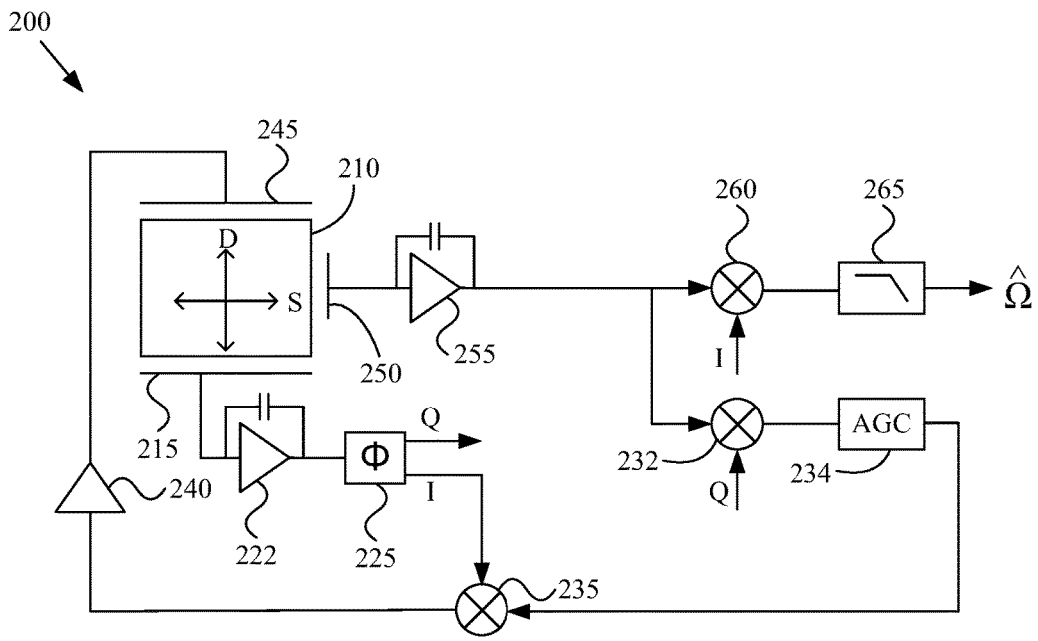
FIG. 2 shows an example block diagram of a MEMS gyroscope circuit that utilizes quadrature signal components for drive control, in accordance with various aspects of the present disclosure.

FIG. 2 shows an example block diagram of a MEMS gyroscope circuit 200 (or system) that utilizes quadrature signal components for drive signal control, in accordance with various aspects of the present disclosure. The example circuit 200 may, for example, share any or all characteristics with the example circuit 100 illustrated in FIG. 1 and discussed herein and/or with any circuit or system presented herein.

The example gyroscope circuit 200 and/or any gyroscope presented herein or portion thereof may, for example, share any or all characteristics with the example gyroscopes and/or portions thereof presented in commonly owned U.S. Pat. No. 7,290,435, titled "Method and Apparatus for Electronic Cancellation of Quadrature Error," filed Feb. 6, 2006; U.S. patent application Ser. No. 13/235,296, titled "Micromachined Gyroscope Including a Guided Mass System," filed Sep. 16, 2011; and U.S. patent application Ser. No. 14/041,810, titled "Micromachined Gyroscope Including a Guided Mass System," filed Sep. 30, 2013; the entirety of each of which is hereby incorporated herein by reference.

The circuit 200 comprises a mass 210, which may also be referred to herein as a proof mass, which is driven in a vibratory or oscillatory manner in the drive direction, labelled "D" in FIG. 2. The circuit 200 may, for example, comprise a drive sensor 215 (e.g., a capacitive sensor or other type of sensor), a drive sense C2V circuit 222, a phase shifter 225, a drive Q mixer 232, a gain control circuit (AGC) 234, a drive I mixer 235, a drive amplifier 240, and a drive actuator 245 (e.g., an electrostatic actuator, etc.).

The drive sensor 215 may, for example, sense movement of the proof mass 210 in the drive direction "D" and output a drive sense capacitance signal indicative of the sensed drive motion of the proof mass 210. The drive sense C2V circuit 222 may then convert the drive sense capacitance signal provided by the drive sensor 215 to a drive sense voltage signal, and provide the drive sense voltage signal to the phase shifter 225. In the example circuit 200, the drive sense C2V circuit 222 may, for example, comprise a relatively low-quality amplifier circuit, for example relative to the Coriolis sense C2V circuit 255 (e.g., characterized by relatively lower gain, relatively lower bandwidth, relatively less linearity, relatively higher noise, relatively lower output dynamic range, relatively lower slew rate, relatively higher convergence time, relatively lower stability, etc.).

Note that, as discussed herein, a relatively low-quality amplifier circuit may be constructed to utilize substantially less power than a relatively high-quality amplifier circuit. For example, in an example implementation, a relatively low-quality drive sense C2V circuit 222 (e.g., utilizing a relatively low-quality amplifier circuit, etc.) may utilize substantially less power (e.g., 15% less, 25% less, 50% less, etc.) than the Coriolis sense C2V circuit 255 (e.g., utilizing a relatively high-quality amplifier circuit, etc.). Additionally, relatively low-quality amplifiers may occupy less integrated circuit area than relatively high-quality amplifiers (e.g., comprising fewer electrical components, etc.).

The phase shifter 225 may, for example, output an in-phase signal "I" (which is approximately 90 degree phase shifted from the drive sense capacitance signal and in-phase with the proof-mass velocity in the drive direction) to the drive I mixer 235 for mixing with the output of the AGC circuit 234 to generate a drive signal. The drive signal may then be amplified by the drive amplifier 240 and provided to the drive actuator 245, which generates the force (e.g., electrostatic force, etc.) to vibrate the proof mass 210. The phase shifter 225 may also, for example, output a quadrature-phase signal "Q" (e.g., 90° phase shift relative to signal I) to the drive Q mixer 232 for mixing with the output of the Coriolis sense C2V circuit 255, thus providing (or isolating) the quadrature component of the signal output from the Coriolis sense C2V circuit 255. The AGC circuit 234 may then process the quadrature component (e.g., by determining and/or processing the amplitude thereof) to determine characteristics of the signal (e.g., a desired amplitude, etc.) to be provided to the drive I mixer 235. For example, an amplitude of the drive signal utilized to drive the proof mass 210 in the drive direction D may be based, at least in part, on detected motion of the proof mass 210 in the sense direction S.

The circuit 200 may also, for example, comprise a Coriolis sensor 250 (e.g., a capacitive sensor, etc.), a Coriolis sense C2V circuit 255, a sense mixer 260, and a low-pass filter 265. The Coriolis sensor 250 may, for example, sense movement of the proof mass 210 in the sense direction "S" and output a Coriolis sense capacitance signal indicative of the sensed motion of the proof mass 210 in the sense direction "S." The signal output from the Coriolis sensor 250 may generally, for example, comprise a composite signal that comprises a signal component indicative of the Coriolis force caused by rotation of the gyroscope and also a quadrature signal component, as discussed herein. The quadrature signal component may, for example, be proportional to the drive amplitude of the proof mass 210 and independent of rotation of the gyroscope. For example, the quadrature signal component may exist even when the gyroscope is not being rotated.

The Coriolis sense C2V circuit 255 may then convert the Coriolis sense capacitance signal provided by the Coriolis sensor 250 to a Coriolis sense voltage signal, and provide the Coriolis sense voltage signal to the sense mixer 260. In the example circuit 200, the Coriolis sense C2V circuit 255 may, for example, comprise a relatively high-quality amplifier circuit (e.g., characterized by relatively high gain, relatively high bandwidth, relatively high linearity, relatively low noise, relatively high output dynamic range, relatively high slew rate, relatively fast convergence time, relatively high stability, etc.). In an example implementation, the Coriolis sense C2V circuit 255 may be of a quality generally higher than the drive sense C2V circuit 222.

The sense mixer 260 may also, for example, receive the in-phase signal (I) output by the phase shifter 225. The sense mixer 260 may then mix the in-phase signal (I) and the Coriolis sense voltage signal received from the Coriolis sense C2V circuit 255 to generate a signal with the quadrature components removed. The output of the sense mixer 260 may then be filtered by the low-pass filter (LPF) 265 and output as a signal $\hat{\Omega}$, which is indicative of the angular velocity at which the gyroscope is being rotated.

Compared to the AGC circuit 130 FIG. 1, which processes the drive sense voltage signal output from the drive sense C2V circuit 120 to determine gain adjustments, the AGC circuit 234 of FIG. 2 processes the Coriolis sense voltage signal (e.g., a quadrature component thereof) output from the Coriolis sense C2V circuit 255. Accordingly, the performance requirements of the drive sense C2V circuit 222 of FIG. 2, and thus the power consumption, may be substantially less than the performance requirements of the drive sense C2V circuit of FIG. 1. For example, since the output signal of the drive sense C2V circuit 222 of FIG. 2 is being processed for phase detection, rather than both phase and amplitude detection, the drive sense C2V circuit 222 may comprise a more energy-efficient architecture (e.g., with lower performance requirements, many examples of which are provided herein) than the drive sense C2V circuit 120 of FIG. 1. For example, the amplitude accuracy of the drive sense C2V circuit 222 is relatively less important than if the output of the drive sense C2V circuit 222 was used as an amplitude reference. Additionally, the requirements of the Coriolis sense C2V circuit 255 of FIG. 2 and the Coriolis sense C2V circuit 155 of FIG. 1 may be substantially similar.

Note that the example circuit 200 was generally presented in the analog domain for illustrative clarity. It should be understood that various aspects of the example circuit 200 may be performed in the digital domain (e.g., by discrete and/or programmable digital circuitry, for example a processor executing software instructions stored in a memory), for example after analog-to-digital conversion. For example, any or all of the drive I mixer 235, sense mixer 260, drive Q mixer 232, LPF 265, and AGC 234, or portions thereof, may be performed in the digital domain. For example, in an example implementation in which the AGC 234 functionality is performed in the digital domain the output of the AGC 234 may be converted back to the analog domain prior to input to the drive I mixer 235. Also for example, in an example implementation in which the drive I mixer 235 functionality is performed in the digital domain, the output of the drive I mixer 235 may be converted to the analog domain before providing such output to the drive amplifier.

Various aspects of this disclosure may, for example, comprise adding electrical and/or mechanical features to generate a quadrature signal component (e.g., a quadrature signal component with a generally predictable envelope). So long as the quadrature signal component amplitude is kept relatively small, for example relative to the amplitude of the in-phase signal, the maximum range of the circuitry need not be substantially modified. For example, if the quadrature signal component amplitude is kept less than the maximum in-phase signal amplitude (or alternatively to ½ or less, ⅓ or less, ¼ or less, etc.), then the head-room of the circuitry need not be substantially increased, if at all.

The quadrature signal component of the Coriolis sense capacitance signal (or Coriolis sense voltage signal), for example as ultimately processed by the AGC circuit 234, may comprise any of a variety of characteristics. The quadrature signal component may, for example, be passively monitored, measured, and/or utilized. For example, the quadrature signal component resulting from imperfect fabrication (and/or from intended imperfections, for example determined at design time) may be empirically tested (e.g., during production and/or during the life of the product) to determine its characteristics. For example, the gyroscope may be driven in its intended manner while the quadrature signal is analyzed to determine characteristics of a target quadrature signal component for a device. In an example scenario, if necessary and/or advantageous, a relatively high-quality drive sense C2V circuit may be utilized (e.g., temporarily switched in) to monitor the proof mass during testing. Such a high-quality drive sense C2V circuit may, for example, be built into the gyroscope circuitry and only switched in when desired (e.g., for calibration periods of operation, as a failure remedy, etc.). The AGC 234 can then base its output drive control signal on the difference between a received quadrature signal and a target quadrature signal (e.g., a quadrature signal (or component) that should have been received).

In another example scenario, the fabrication specification for the MEMS gyroscope circuit may be modified to intentionally cause quadrature-type behavior in the mechanical structure. For example, an etch angle for a mechanical coupling (e.g., a spring), or for one side thereof, may be specified to be at a sloped angle (e.g., as opposed to vertical or horizontal), where such angled fabrication causes movement of the proof mass in a direction orthogonal to the primary drive direction. Material specifications may also be specified to intentionally cause quadrature movement of the proof mass (e.g., caused by respective compliance differences of different materials, etc.).

Figure 3:
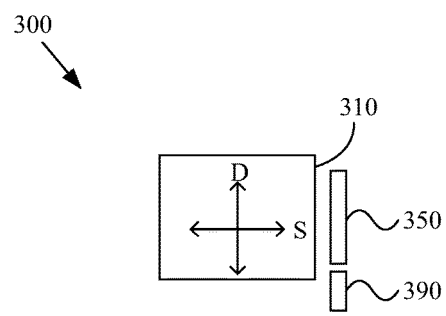
FIG. 3 shows an example proof mass and sensor system, in accordance with various aspects of the present disclosure.

Another example manner in which mechanical quadrature motion may be introduced to (or induced in) the gyroscope may comprise utilizing electrostatic force to draw (or push) the proof mass into a quadrature direction during vibration and/or repel the proof mass in the quadrature direction. Any of a variety of techniques (e.g., electrostatic techniques, etc.) may be utilized to cause such quadrature motion. FIG. 3 provides a non-limiting example. In particular, FIG. 3 shows an example proof mass and sensor system 300, in accordance with various aspects of the present disclosure. The example system 300 or components thereof may for example share any or all characteristics with generally analogous systems or components thereof (e.g., with regard to the example circuit 100 of FIG. 1, example circuit 200 of FIG. 2, example systems 420, 440, and 460 of FIG. 4, etc.).

In the example system 300, the Coriolis sensor 350 senses (e.g., capacitively senses, etc.) movement of the proof mass 310 in the sense direction "S." The proof mass 310 is generally driven in the drive direction "D." The proof mass 310 may, for example, be maintained at a DC bias voltage (e.g., 25V, etc.), and an electrode 390 may be maintained at another voltage (e.g., ground, etc.). The difference in potential between the proof mass 310 and the electrode 390, and the relative locations of the proof mass 310 and the electrode 390 are such that, as the degree of alignment between the proof mass 310 and the electrode 390 increases, the attractive force between proof mass 310 and the electrode 390 increases. This electrostatic force will provide force on the proof mass 310 in the sense direction (e.g., toward the Coriolis sensor 350, etc.) while the proof mass 310 is driven by the drive circuitry in the drive direction. Such an architecture may, for example, advantageously provide for a controllable amount of quadrature motion of the proof mass 310.

Additionally for example, such quadrature motion may be adaptable. As mentioned herein, the gyroscope may have enough quadrature motion due to fabrication imperfections and/or due to intentional imperfections or asymmetry in connectors (or springs), etc. In such a scenario, the electrode 390 may be charged in a manner that does not affect the motion of the proof mass and/or in a manner that counteracts at least a portion of the already-existing quadrature motion. In another scenario, for example in which the native quadrature motion exists but is too small, the electrode 390 may be charged in a manner that augments the native quadrature motion, thereby creating (or tuning) a desired overall amount of quadrature motion. Such adjustments may be determined during production testing, during calibration operation, during normal operation, etc.

In addition to (or instead of) mechanical, material, and/or electrical manners of creating a desired amount of quadrature motion of the proof mass, various aspects of this disclosure may incorporate sensing features to enhance the sensing of quadrature motion. Various example characteristics of such sensing features are provided herein.

Figure 4:
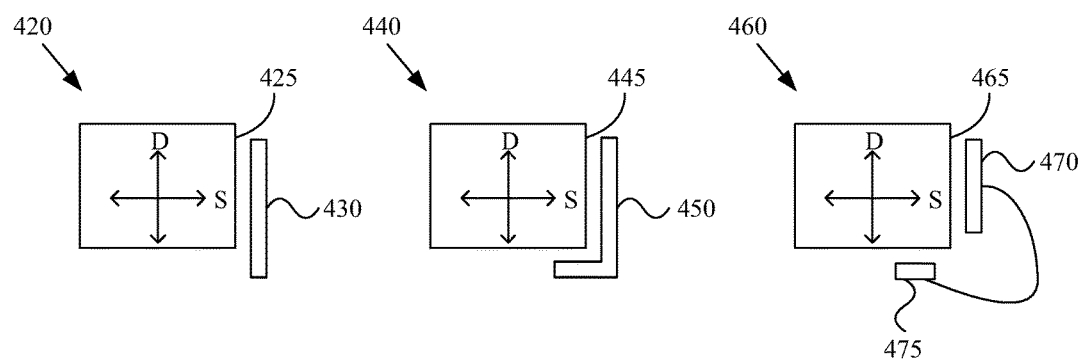
FIG. 4 shows various examples of a proof mass and sensor system, in accordance with various aspects of the present disclosure.

FIG. 4 shows various examples of a proof mass and sensor system, in accordance with various aspects of the present disclosure. The example systems 420, 440, and/or 460, or components thereof, may share any or all characteristics with generally analogous systems or components thereof (e.g., with regard to the example circuit 100 of FIG. 1, example circuit 200 of FIG. 2, example system 300 of FIG. 3, other systems of FIG. 4, etc.).

In a first example system 420, a sensor 430 (e.g., a capacitive sensor 430) or electrode thereof may be elongated, for example beyond one or more of the dimensions of the proof mass (e.g., at a steady state position, at a motion extreme in one of the drive directions, etc.). In such a configuration, the amount of capacitive coupling between the proof mass 425 and the sensor 430 may vary as a function of movement of the proof mass 425 in the drive direction D. For example, the effective capacitive area of the coupled capacitive plates changes as a function of such movement. Such a configuration may, for example, cause the sensor 430 to detect movement of the proof mass 425 simultaneously in the sense direction S (orthogonal to the drive direction D) and in the drive direction D. For example, the drive amplitude may be encoded in the quadrature phase.

In a second example system 440, the shape of the sensor 450 may be such that the sensor 450 wraps around a corner of the proof mass 445. For example, a first portion of the sensor 450 may run parallel to the proof mass 445 in the drive direction D, and a second portion of the sensor 450 may run parallel to the proof mass 445 in the sense direction S. In such a configuration, the sensor 450 may detect movement of the proof mass 445 directly toward the first portion of the sensor 450 in the sense direction S and directly toward the second portion of the sensor 450 in the drive direction D. For example, the detection of motion in the sense direction S may at least mostly occur in response to changing capacitive gap size, and the detection of motion in the drive direction may also occur in response to changing capacitive gap size. Note that the configuration of the example system 440 may share any or all characteristics with the example system 420 (e.g., wrapping the sensor 450 (or electrode thereof) around the proof mass 445 and extending the sensor 450 past at least one side of the proof mass 445) and/or all characteristics of the example system 460.

In a third example system 460, an additional electrode 475 is placed to sense changing capacitive gap size in the drive direction D. The sense electrodes may then be electrically coupled. In such a configuration, the sensor 470 will detect movement of the proof mass 465 directly toward a first electrode of the sensor 470 in the sense direction S and directly toward a second electrode 475 of the sensor in the drive direction D. For example, the detection of motion in the sense direction S may at least mostly occur in response to changing capacitive gap size, and the detection of motion in the drive direction D may also occur in response to changing capacitive gap size. Note that the configuration of the example system 460 may share any or all characteristics with the example systems 420 and/or 440.

Various aspects of the present disclosure are demonstrated by non-limiting example in commonly owned U.S. Pat. No. 7,290,435, titled "Method and Apparatus for Electronic Cancellation of Quadrature Error," filed Feb. 6, 2006; U.S. patent application Ser. No. 13/235,296, titled "Micromachined Gyroscope Including a Guided Mass System," filed Sep. 16, 2011; and U.S. patent application Ser. No. 14/041,810, titled "Micromachined Gyroscope Including a Guided Mass System," filed Sep. 30, 2013; the entirety of each of which is hereby incorporated herein by reference.

In summary, various aspects of the present disclosure provide a system and/or method for utilizing quadrature signals, for example in a MEMS gyroscope, to control drive signal characteristics (e.g., amplitude, etc.). While the foregoing has been described with reference to certain aspects and embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment(s) disclosed, but that the disclosure will include all embodiments falling within the scope of the appended claims.

What is claimed is:

1. A MEMS gyroscope comprising:
   a first sense circuit operable to sense motion of a mass in a drive direction;
   a second sense circuit operable to sense motion of the mass in a sense direction different from the drive direction; and
   drive circuitry operable to:
      generate a drive signal comprising an amplitude based on the sensed motion of the mass in the sense direction;
      modify a phase of the drive signal based on a different phase determined from the sensed motion of the mass in the drive direction; and
      provide the modified drive signal to drive the mass in the drive direction.

2. The MEMS gyroscope of claim 1, wherein the second sense circuit comprises a sense amplifier that outputs a signal to a plurality of mixers.

3. The MEMS gyroscope of claim 1, wherein:
   the first sense circuit comprises a first sense amplifier; and
   the second sense circuit comprises a second sense amplifier that consumes more power than the first sense amplifier.

4. The MEMS gyroscope of claim 1, wherein:
   the first sense circuit comprises a first sense amplifier; and
   the second sense circuit comprises a second sense amplifier that is a higher quality amplifier than the first sense amplifier.

5. The MEMS gyroscope of claim 1, wherein:
   the second sense circuit comprises a second sense amplifier; and
   the drive circuitry comprises:
      a first mixer;
      a second mixer; and
      a phase shifter operable to output an I-phase signal to the first mixer and a Q-phase signal to the second mixer.

6. The MEMS gyroscope of claim 5, wherein the amplitude of the drive signal is based on an output of the second mixer.

7. The MEMS gyroscope of claim 6, wherein the second mixer is operable to receive an output from the second sense amplifier.

8. The MEMS gyroscope of claim 1, wherein the second sense circuit is operable to sense motion of the mass in the drive direction and in the sense direction.

9. The MEMS gyroscope of claim 8, wherein the second sense circuit comprises a sensor electrode, the length of which extends past the mass.

10. The MEMS gyroscope of claim 8, wherein the second sense circuit comprises:
    a first sensor electrode that is operable to sense motion of the mass in the sense direction; and
    a second sensor electrode that is operable to sense motion of the mass in the drive direction.

11. The MEMS gyroscope of claim 1, wherein the gyroscope comprises an electrical circuit that is operable to cause motion of the mass in the sense direction.

12. The MEMS gyroscope of claim 1, wherein the gyroscope comprises a mechanical feature specifically adapted to cause motion of the mass in the sense direction.

13. A MEMS gyroscope comprising:
    a proof mass operable to be driven in a first direction with a drive signal;
    a first sense circuit operable to sense motion of the proof mass in the first direction, and output a first sense signal indicative of movement of the proof mass in the first direction;
    a second sense circuit operable to sense motion of the proof mass in a second direction that is orthogonal to the first direction, and output a second sense signal that comprises:
       an in-phase component indicative of at least movement of the proof mass in the second direction caused by rotation of the gyroscope; and
       a quadrature component indicative of at least movement of the proof mass in the second direction that is independent of rotation of the gyroscope; and
    drive circuitry that generates a drive amplitude signal having an amplitude that is based on the quadrature component of the second sense signal, modifies a phase of the drive amplitude signal based on a different phase determined from the first sense signal, and provides the drive signal based on the modified drive amplitude signal.

14. The MEMS gyroscope of claim 13, wherein:
    the first sense circuit comprises a first sense amplifier; and
    the second sense circuit comprises a second sense amplifier that consumes more power than the first sense amplifier.

15. The MEMS gyroscope of claim 13, wherein:
    the second sense circuit comprises a second sense amplifier; and
    the drive circuitry comprises:
    a first mixer;
    a second mixer; and
    a phase shifter operable to output an in-phase signal to the first mixer and a quadrature-phase signal to the second mixer.

16. The MEMS gyroscope of claim 13, wherein the second sense circuit is configured to sense motion of the proof mass in the first direction and the second direction.

17. The MEMS gyroscope of claim 13, comprising a feature specifically adapted to cause motion of the proof mass in the second direction.

18. A MEMS gyroscope comprising:
    a mass that is driven by a drive signal in a drive direction;
    a sense circuit operable to sense motion of the mass in a sense direction different from the drive direction; and
    drive circuitry operable to generate a drive amplitude signal having an amplitude that is based on the sensed motion of the mass in the sense direction and modify a phase of the drive amplitude signal based on a different phase determined from the drive motion in the drive direction, wherein the drive signal is based on the modified drive amplitude signal.

19. The MEMS gyroscope of claim 18, comprising a second sense circuit that senses motion of the mass in the drive direction, and wherein the phase of the drive amplitude signal is modified based on the sensed motion of the mass in the drive direction.

20. The MEMS gyroscope of claim 18, wherein a gain control circuit of the drive circuity generates the drive amplitude signal and a mixer of the drive circuitry mixes the drive amplitude signal with a phase signal that is in-phase with the motion of the mass in the drive direction to modify the phase of the drive amplitude signal.

* * * * *